US010421393B2

(12) United States Patent
Crews

(10) Patent No.: US 10,421,393 B2
(45) Date of Patent: Sep. 24, 2019

(54) LIGHTING APPARATUS FOR A ROOFTOP OF AN EMERGENCY VEHICLE

(71) Applicant: John Crews, Garland, TX (US)

(72) Inventor: John Crews, Garland, TX (US)

( * ) Notice: Subject to any disclaimer, the term of this patent is extended or adjusted under 35 U.S.C. 154(b) by 0 days.

(21) Appl. No.: 15/881,337

(22) Filed: Jan. 26, 2018

(65) Prior Publication Data

US 2019/0047466 A1 Feb. 14, 2019

Related U.S. Application Data

(60) Provisional application No. 62/545,371, filed on Aug. 14, 2017.

(51) Int. Cl.

| | |
|---|---|
| ***B60Q 1/26*** | (2006.01) |
| ***B60Q 1/52*** | (2006.01) |
| ***F21S 41/153*** | (2018.01) |
| ***F21S 43/14*** | (2018.01) |
| ***F21S 43/15*** | (2018.01) |
| ***F21S 2/00*** | (2016.01) |

(52) U.S. Cl.

CPC .............. *B60Q 1/2611* (2013.01); *B60Q 1/52* (2013.01); *F21S 41/153* (2018.01); *F21S 43/14* (2018.01); *F21S 43/15* (2018.01); *F21S 2/005* (2013.01)

(58) Field of Classification Search

CPC . B60Q 1/2611; B60Q 1/52; B60Q 1/50; F21S 43/15; F21S 43/14; G09F 2013/044; G09F 2013/227

USPC .......................................................... 362/493

See application file for complete search history.

(56) References Cited

U.S. PATENT DOCUMENTS

| | | | | |
|---|---|---|---|---|
| 3,701,210 | A * | 10/1972 | Smith | G09F 21/04 116/28 R |
| 6,424,269 | B1 | 7/2002 | Pederson | |
| 9,868,387 | B2 * | 1/2018 | Salter | H05B 37/0218 |
| 2002/0048174 | A1 * | 4/2002 | Pederson | B60Q 1/2611 362/487 |
| 2007/0217212 | A1 * | 9/2007 | Klinkman | B60Q 1/24 362/493 |
| 2009/0256697 | A1 * | 10/2009 | Tallinger | B60Q 1/2611 340/472 |
| 2012/0018474 | A1 * | 1/2012 | Lindberg | B60Q 1/18 224/328 |
| 2012/0224383 | A1 * | 9/2012 | Shipman | B60Q 1/2611 362/493 |
| 2018/0312106 | A1 * | 11/2018 | Tatara | B60Q 1/26 |

* cited by examiner

*Primary Examiner* — William N Harris
(74) *Attorney, Agent, or Firm* — Hitchcock Evert LLP

(57) ABSTRACT

A lighting apparatus includes a light-sheet assembly configured to conform to the rooftop. The light-sheet assembly extends at least one-half the length of the rooftop, and further extends at least one-half the width of the rooftop when mounted to the rooftop. The light-sheet assembly further includes a plurality of light emitting diode (LED) lights that are distributed about the rooftop when the light-sheet assembly is mounted to the rooftop. A controller is communicably coupled to the light-sheet assembly and configured to operate the plurality of LED lights. A roof-mount is affixed to the light-sheet assembly and configured to mount the light-sheet assembly to the rooftop of the emergency vehicle. The lighting apparatus is useful for emergency vehicles.

18 Claims, 4 Drawing Sheets

100
105
50
14
130
120
11
110
10
17
12
120
15
107

LIGHTING APPARATUS FOR A ROOFTOP OF AN EMERGENCY VEHICLE

CROSS-REFERENCE TO RELATED APPLICATION(S)

The present application is related to and claims priority to U.S. Provisional Patent Application No. 62/545,958 filed Aug. 14, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

Technical Field

The present invention relates generally to the field of lighting units of existing art and more specifically relates to emergency vehicle lighting.

Related Art

Emergency vehicles in each country have defined colors and patterns to identify emergency situations. The most commonly known visual warning indication system that corresponds to emergency vehicles is the use of exterior lights that are mounted on the roof of a vehicle. Local governments employ the use of these illuminated indicators in various sectors. Police vehicles, ambulances and fire trucks are the most widely recognized of the many emergency response organizations that utilized high visibility roof-mounted warning systems.

U.S. Pat. No. 6,424,269 to John C. Pederson relates to a LED warning signal light and light bar. The described LED warning signal light and light bar includes light emitting diode (LED) warning signal light, the warning signal light comprising an array of light sources configured on a light support and in electrical communication with a controller and a power supply, battery, or other electrical source. The warning signal light provides various colored light signals for independent use or use by an emergency vehicle. These light signals may include a stationary light, strobe light, revolving light, and an oscillating light. Additionally, the warning signal light may be capable of displaying symbols, reverse characters, or arrows. Preferably, rotating and oscillating light signals are produced by sequentially illuminating columns of LEDs on a stationary light support. However, the warning signal light may also be rotated or oscillated via mechanical means. The warning signal light may also be transportable for easy connection to a stand such as a tripod for electrical connection to a power supply as a stand-alone warning signal.

SUMMARY OF THE INVENTION

In view of the foregoing disadvantages inherent in the known emergency vehicle lighting art, the present disclosure provides a novel lighting apparatus device. The general purpose of the present disclosure, which will be described subsequently in greater detail, is to provide a lighting apparatus device.

A lighting apparatus for a rooftop of an emergency vehicle is disclosed herein. The rooftop has a length extending from a front windshield to a back windshield, and also has a width extending from a left vehicle side to a right vehicle side, relative to a seated driver. The lighting apparatus includes a light-sheet assembly configured to conform to the rooftop, a controller, and a roof-mount. The light-sheet assembly extends at least one-half the length of the rooftop, and further extends at least one-half the width of the rooftop when mounted to the rooftop. The light-sheet assembly further includes a plurality of light emitting diode (LED) lights that are distributed about the rooftop when the light-sheet assembly is mounted to the rooftop. The controller is communicably coupled to the light-sheet assembly and configured to operate the plurality of LED lights. The roof-mount is affixed to the light-sheet assembly and configured to mount the light-sheet assembly to the rooftop of the emergency vehicle.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a lighting apparatus device, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to emergency vehicle lighting and more particularly to a lighting apparatus as used to improve the visibility of emergency lights.

Generally, the present disclosure provides police vehicles, ambulances, fire trucks, and other emergency vehicles with a flat-profile system of emergency lights. It may feature high-brightness, multi- or single-color LEDs embedded within the lighting apparatus for maximum visibility. The lighting apparatus may present the same frontal area as a conventional emergency light bar when viewed from a typical driver's eye height, ensuring the lights are seen from both oncoming and trailing motorists. The lighting apparatus may further allow operators to control flashing and display patterns on the lights from within the vehicle. The present disclosure may assist emergency vehicles in travelling at high speeds without worry of reduced acceleration, increased drag, and increased mass. The present disclosure may further describe a system of light sheet apparatuses. The invention may be used unitarily, and alternatively, as a system comprising multiple instances of a lighting apparatus. The light-sheet assembly need not be one continuous piece. The described light-sheet assembly may be partitioned into any conceivable proportions, thereby allowing the lighting apparatus to assume full modular functionality.

Referring now more specifically to the drawings by numerals of reference, there is shown in FIGS. 1-4, various views of a lighting apparatus 100.

Figure 1:
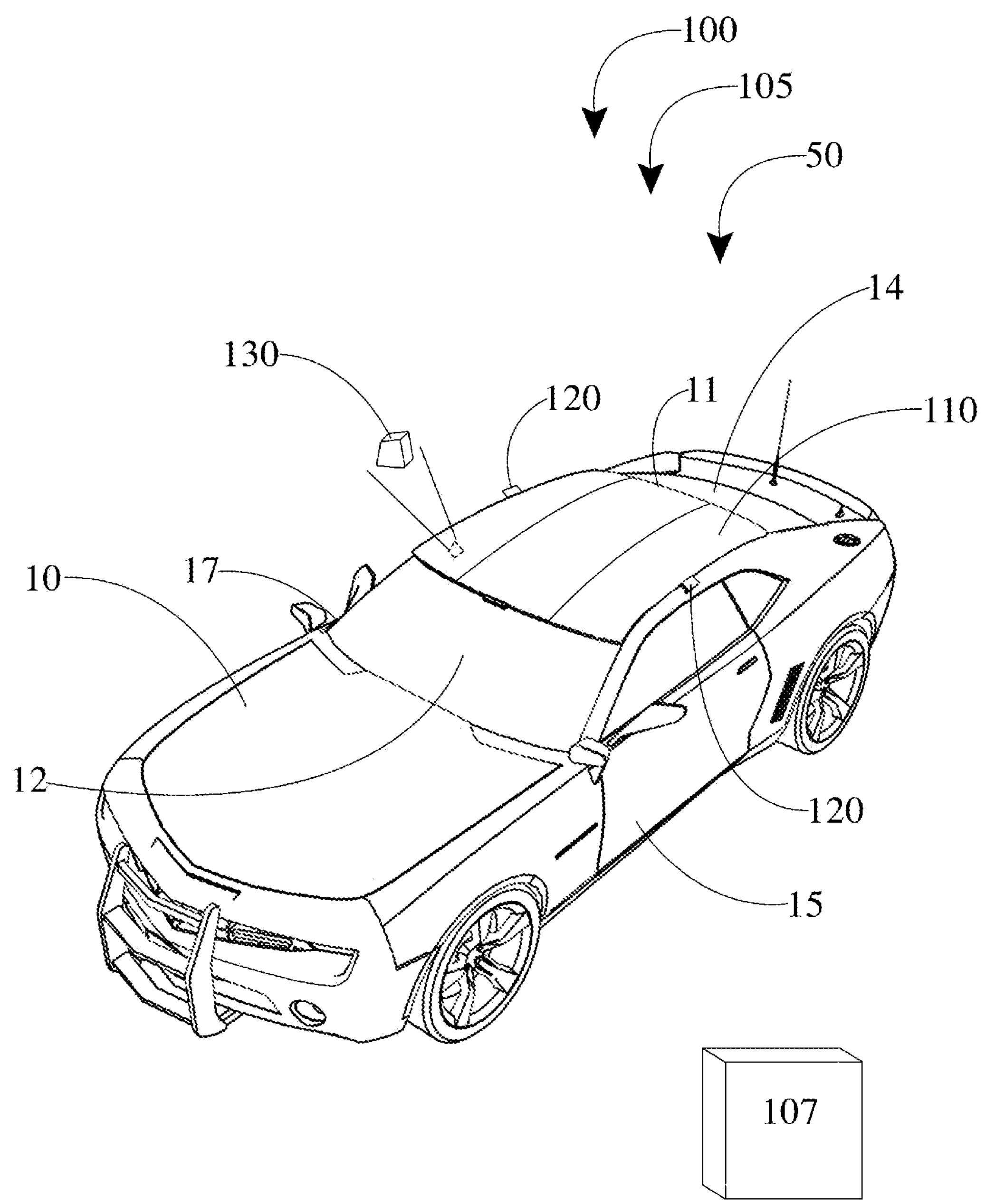
FIG. 1 is a perspective view of the lighting apparatus during an 'in-use' condition, according to an embodiment of the disclosure.

FIG. 1 shows a lighting apparatus during an 'in-use' condition 50, according to an embodiment of the present disclosure. Here, the lighting apparatus 100 may be beneficial for providing emergency indicator lights on a rooftop 11 of an emergency vehicle 10. As commonly known, and for clarity, the rooftop 11 has a length extending from the front windshield 12 to the back windshield 14, and also has a width extending from the left vehicle side 15 to the right vehicle side 17, relative to a seated driver.

As illustrated, the lighting apparatus 100 may include a light-sheet assembly 110, a roof-mount 120, and a controller 130. The light-sheet assembly 110 is coupled to the rooftop 11 of the emergency vehicle 10 via the roof-mount 120. The controller 130 is communicably coupled to the light-sheet assembly 110 and configured to operate a plurality of LED lights 115 (FIG. 2) of the light-sheet assembly 110. For example, the controller 130 may be configured to adjust the magnitude of the illumination produced by the LED lights 115.

The light-sheet assembly 110 may be configured to conform to the rooftop 11. According to one embodiment, the light-sheet assembly 110 may be aerodynamically contoured with the rooftop 11 of the emergency vehicle 10. Further, coverage of the rooftop 11 by the light-sheet assembly 110 may allow the plurality of LED lights 115 to be hemispherically visible above and around the rooftop 11.

The light-sheet assembly 110 extends at least one-half of the length of the rooftop 11, and further extends at least one-half of the width of the rooftop 11 when mounted to the rooftop 11. According, to one embodiment, the light-sheet assembly 110 may be sized and dimensioned such that the light-sheet assembly 110 extends across at least 90 percent of the rooftop of the emergency vehicle 10. However, other embodiments are considered where the light-sheet assembly 110 extends at least 90 percent of the length of the rooftop 11, and alternatively the light-sheet assembly 110 extends at least 90 percent of the width of the rooftop 11. Preferably, and as shown, the light-sheet assembly 110 may extend over substantially the entire length and width of the rooftop 11.

According to one embodiment, the lighting apparatus 100 may be arranged as a kit 105. In particular, the lighting apparatus 100 may further include a set of instructions 107. The instructions 107 may detail functional relationships in relation to the structure of the lighting apparatus 100 such that the lighting apparatus 100 can be used, maintained, or the like, in a preferred manner.

Figure 2:
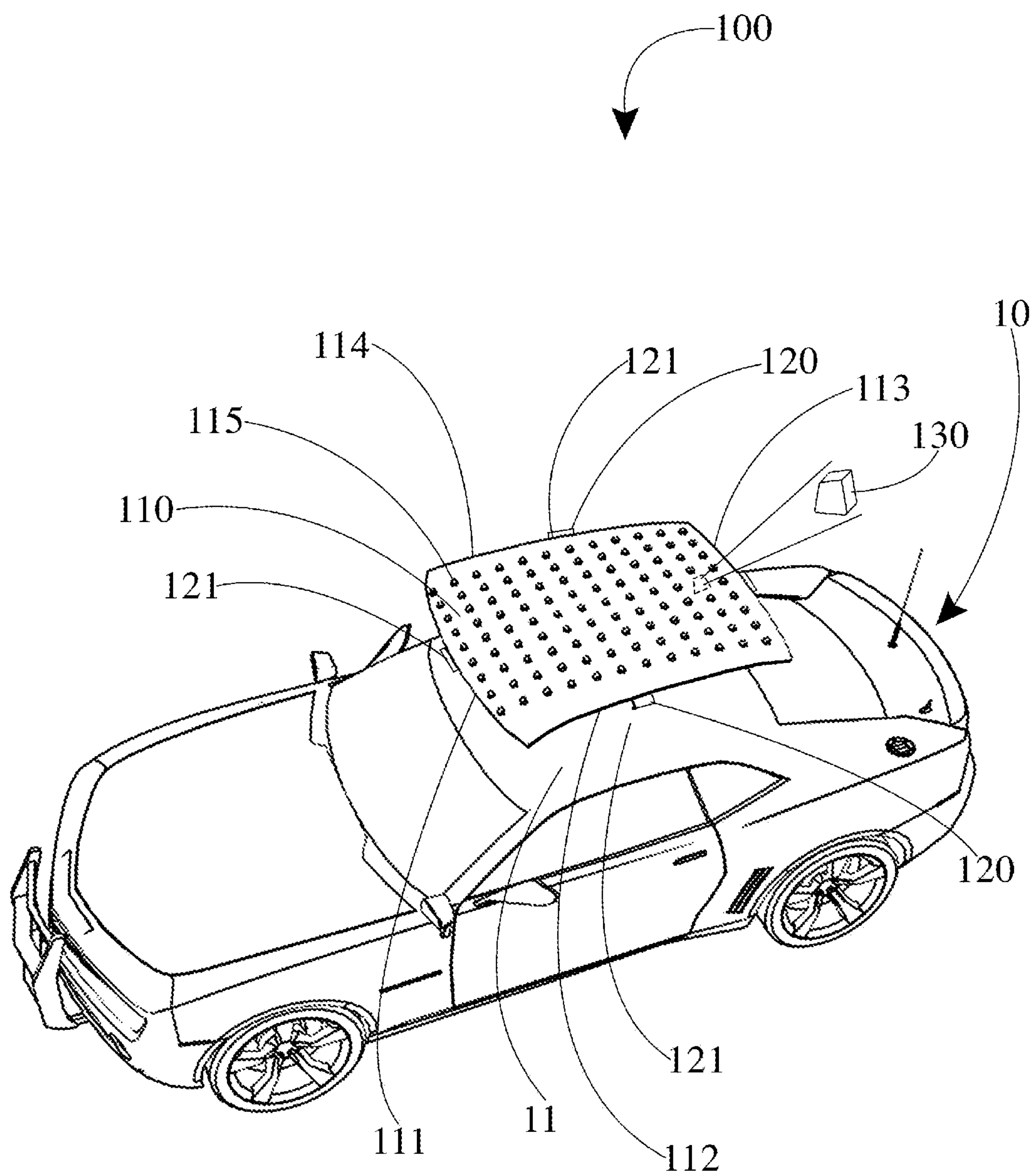
FIG. 2 is an exploded view of the lighting apparatus of FIG. 1, according to an embodiment of the present disclosure.

FIG. 2 is an exploded view of the lighting apparatus of FIG. 1, according to an embodiment of the present disclosure. As above, the lighting apparatus 100 may include the light-sheet assembly 110 configured to be connected to the rooftop 11 of an emergency vehicle 10, the roof-mount 120, and the controller 130.

The light-sheet assembly 110 includes a plurality of light emitting diode (LED) lights 115 distributed about the rooftop 11. The light-sheet assembly 110 may further include a leading edge 111, a trailing edge 113, a left side 112, and a right side 114. The plurality of LED lights 115 may include red, white, blue and yellow LED lights 115. The red, white, and blue LED lights 115 may be arrayed in three separate single-color stripes extending from the leading edge 111 to the trailing edge 113 of the light-sheet assembly 110.

Figure 3:
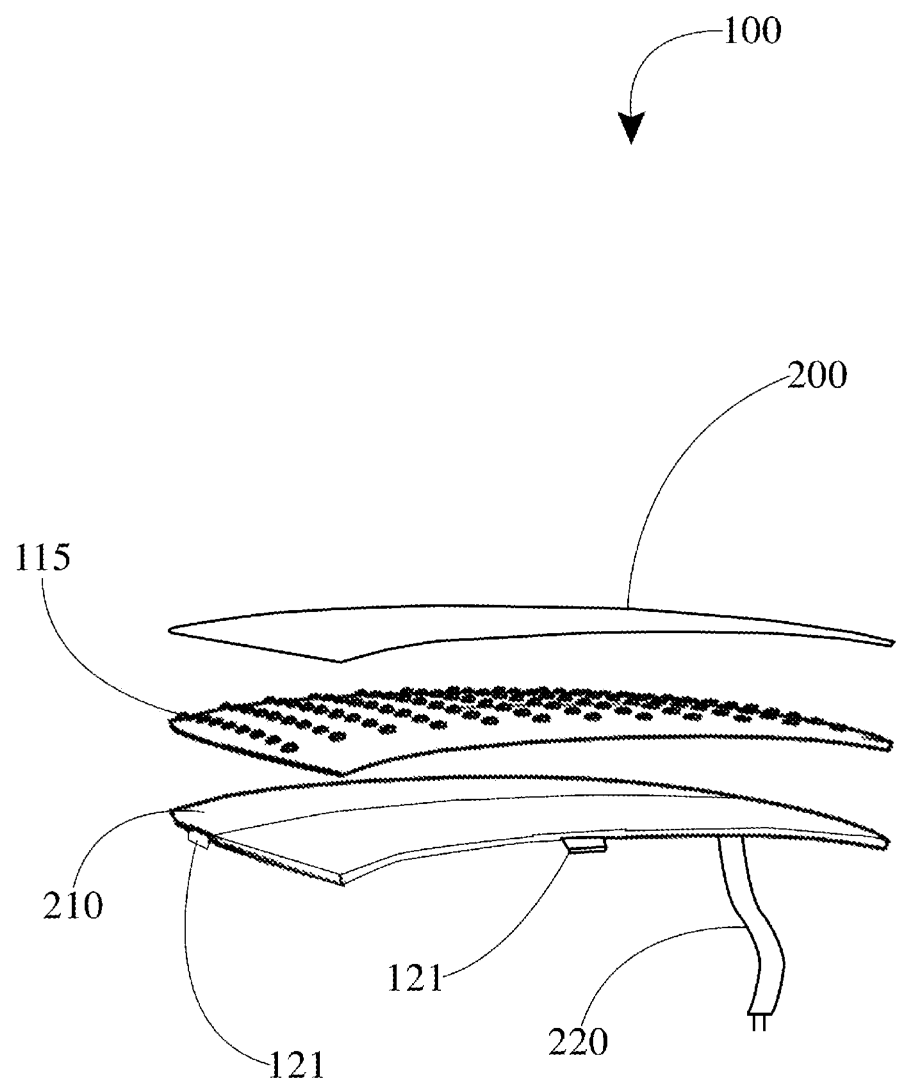
FIG. 3 is another exploded view of the lighting apparatus of FIG. 1, according to an embodiment of the present disclosure.

The roof-mount 120 may include a mechanical couple 121 configured to mechanically attach the light-sheet assembly 110 to the rooftop 11. The mechanical couple 121 may be further configured to mechanically attach the leading edge 111 and the trailing edge 113 of the light-sheet assembly 110 to the rooftop 11. The mechanical couple 121 may be further configured to mechanically attach the left side 112 and the right side 114 of the light-sheet assembly 110 to the rooftop 11. FIG. 3 is another exploded view of the lighting apparatus of FIG. 1, according to an embodiment of the present disclosure. Here, the light-sheet assembly 110 is shown exploded. The light-sheet assembly 110 may include a transparent protective cover 200 over the plurality of LED lights 115. Further, the light-sheet assembly 110 may include a reflective-base 210 configured to reflect light from the plurality of LED lights 115 away from the rooftop 11 (FIG. 1). As illustrated, the plurality of LED lights 115 may be located between the reflective-base 210 and the transparent protective cover 200. The lighting apparatus 100 may further include a vehicle interface 220 configured to electronically couple the lighting apparatus 100 the emergency vehicle 10 (FIG. 1) and provide control of and/or power to the plurality of LED lights 115. Control of and/power to the plurality of LED lights 115 may be provided via the controller 130. According to one embodiment, the vehicle interface 220 and the controller 130 may be communicably coupled to a preexisting user interface (e.g., siren switches) of the emergency vehicle 10.

Figure 4:
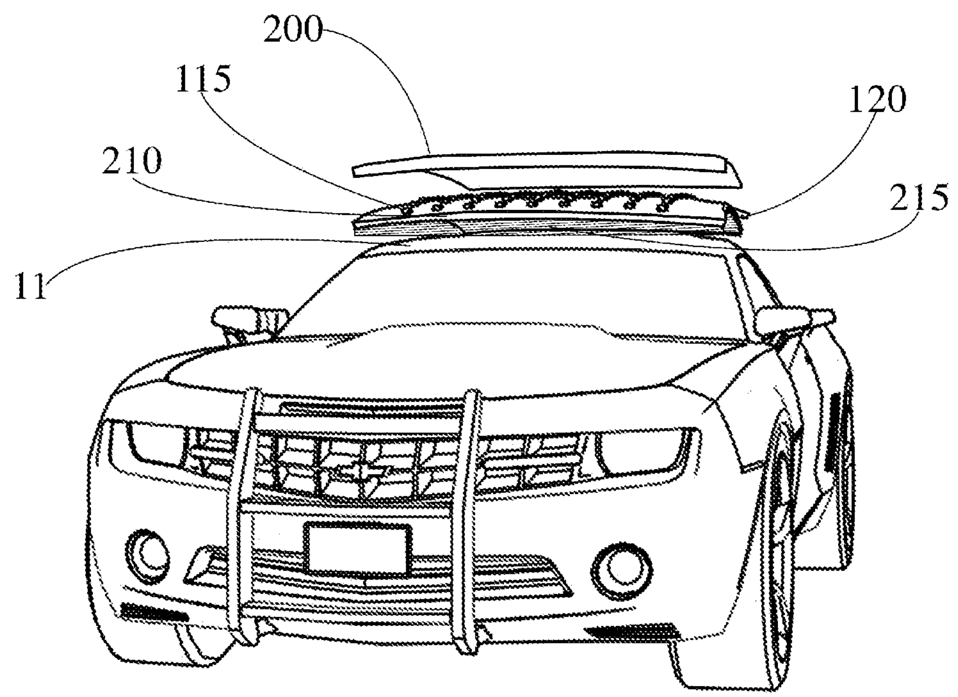
FIG. 4 is another exploded view from a front perspective of the lighting apparatus of FIG. 1, according to another embodiment of the present disclosure.

FIG. 4 is another exploded view from a front perspective of the lighting apparatus of FIG. 1, according to another embodiment of the present disclosure. This view illustrates the configuration of the transparent protective cover 200, the plurality of LED lights 115 and the reflective-base 210 with respect to the rooftop 11. The transparent protective cover 200 is illustrated over the plurality of LED lights 115, relative to the rooftop 11. The plurality of LED lights 115 may be sealed between the reflective-base 210 and the transparent protective cover 200. This embodiment illustrates the roof-mount 120 including an adhesive couple 215 configured to adhere the light-sheet assembly 110 to the rooftop 11. The roof-mount 120 may be integrated with the reflective-base 210.

Upon reading this specification, it should be appreciated that, under appropriate circumstances, considering such issues as user preferences, design preference, structural requirements, marketing preferences, cost, available materials, technological advances, etc., other arrangements such as, for example, vehicle make, model, size, etc., may be sufficient. The embodiments of the disclosure described herein are exemplary and numerous modifications, variations and rearrangements can be readily envisioned to achieve substantially equivalent results, all of which are intended to be embraced within the spirit and scope of the disclosure. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A lighting apparatus for a rooftop of an emergency vehicle, the rooftop having a length extending from a front windshield to a back windshield and also having a width extending from a left vehicle side to a right vehicle side, relative to a seated driver, the lighting apparatus comprising:

a light-sheet assembly having a flat-profile configured to conform to the rooftop, said light-sheet assembly extending at least one-half of the length of the rooftop, and further extending at least one-half of the width of the rooftop when mounted to said rooftop, wherein said light-sheet assembly is aerodynamically contoured to the rooftop, said light-sheet assembly including a plurality of light emitting diode (LED) lights distributed about the rooftop when mounted to said rooftop;

a controller communicably coupled to the light-sheet assembly and configured to operate the plurality of LED lights; and a roof-mount affixed to the light-sheet assembly and configured to mount the light-sheet assembly to the rooftop of the emergency vehicle.

2. The lighting apparatus of claim 1, wherein the area of the light-sheet assembly extends across at least 90 percent of the rooftop of the emergency vehicle.

3. The lighting apparatus of claim 1, wherein the area of the light-sheet assembly extends at least 90 percent of the length of the rooftop.

4. The lighting apparatus of claim 1, wherein the area of the light-sheet assembly extends at least 90 percent of the width of the rooftop.

5. The lighting apparatus of claim 1, wherein the light-sheet assembly further includes a reflective base configured to reflect light from the plurality of LED lights away from the rooftop.

6. The lighting apparatus of claim 5, wherein the light-sheet assembly further includes a transparent protective cover over the plurality of LED lights, relative to the rooftop when installed.

7. The lighting apparatus of claim 6, wherein the plurality of LED lights is sealed between the reflective base and the transparent protective cover.

8. The lighting apparatus of claim 1, further comprising a vehicle interface configured to electronically couple with the emergency vehicle and provide power to the plurality of LED lights; and wherein the controller is integrated into the emergency vehicle.

9. The lighting apparatus of claim 1, wherein the roof-mount includes a mechanical couple configured to mechanically attach the light-sheet assembly to the rooftop.

10. The lighting apparatus of claim 9, wherein the mechanical couple is further configured to mechanically attach a leading edge, a trailing edge, a left side, and a right side of the light-sheet assembly to the rooftop.

11. The lighting apparatus of claim 1, wherein the roof-mount includes an adhesive couple configured to adhere the light-sheet assembly to the rooftop.

12. The lighting apparatus of claim 1, wherein the roof-mount is integrated with a reflective base.

13. The lighting apparatus of claim 1, wherein the plurality of LED lights includes red, white, blue and yellow LED lights, said red, white, and blue LED lights arrayed in three separate single-color stripes extending from a leading edge of the light-sheet assembly to a trailing edge of the light-sheet assembly.

14. The lighting apparatus of claim 1, wherein the plurality of LED lights is hemispherically visible above and around the rooftop.

15. The lighting apparatus of claim 1, wherein the controller is configured to adjust a magnitude of illumination produced by the LED lights.

16. A lighting apparatus for a rooftop of an emergency vehicle, the rooftop having a length extending from a front windshield to a back windshield and also having a width extending from a left vehicle side to a right vehicle side, relative to a seated driver, the lighting apparatus comprising:

a light-sheet assembly configured to conform to the rooftop, said light-sheet assembly extending at least one-half of the length of the rooftop, and further extending at least one-half of the width of the rooftop when mounted to said rooftop, said light-sheet assembly including a plurality of light emitting diode (LED) lights distributed about the rooftop when mounted to said rooftop;

a controller communicably coupled to the light-sheet assembly and configured to operate the plurality of LED lights;

a roof-mount affixed to the light-sheet assembly and configured to mount the light-sheet assembly to the rooftop of the emergency vehicle; and a vehicle interface configured to electronically couple with the emergency vehicle and provide power to the plurality of LED lights; and wherein the light-sheet assembly extends across at least 90 percent of the rooftop of the emergency vehicle;

wherein the light-sheet assembly extends at least 90 percent of the length of the rooftop;

wherein the light-sheet assembly extends at least 90 percent of the width of the rooftop;

wherein the light-sheet assembly is aerodynamically contoured to the rooftop;

wherein the light-sheet assembly further includes a reflective base configured to reflect light from the plurality of LED lights away from the rooftop;

wherein the light-sheet assembly further includes a transparent protective cover over the plurality of LED lights, relative to the rooftop when installed;

wherein the plurality of LED lights is sealed between the reflective base and the transparent protective cover;

wherein the controller is integrated into the emergency vehicle;

wherein the roof-mount includes a mechanical couple configured to mechanically attach the light-sheet assembly to the rooftop;

wherein the mechanical couple is further configured to mechanically attach a leading edge, a trailing edge, a left side, and a right side of the light-sheet assembly to the rooftop;

wherein the roof-mount is integrated with the reflective base;

wherein the plurality of LED lights includes red, white, blue and yellow LED lights, said red, white, and blue LED lights arrayed in three separate single-color stripes extending from the leading edge of the light-sheet assembly to the trailing edge of the light-sheet assembly;

wherein the plurality of LED lights is hemispherically visible above and around the rooftop; and wherein the controller is configured to adjust a magnitude of illumination produced by the LED lights.

17. The lighting apparatus of claim 16, wherein the lighting apparatus is arranged as a kit.

18. A lighting apparatus for a rooftop of an emergency vehicle, the rooftop having a length extending from a front windshield to a back windshield and also having a width extending from a left vehicle side to a right vehicle side, relative to a seated driver, the lighting apparatus comprising:

a light-sheet assembly having a flat-profile configured to conform to the rooftop, wherein said light-sheet assembly is aerodynamically contoured to the rooftop, said light-sheet assembly including a plurality of light emitting diode (LED) lights distributed about the rooftop when mounted to said rooftop;

a controller communicably coupled to the light-sheet assembly and configured to operate the plurality of LED lights; and a roof-mount affixed to the light-sheet assembly and configured to mount the light-sheet assembly to the rooftop of the emergency vehicle.

* * * * *